US012451477B1

(12) United States Patent
Brown et al.

(10) Patent No.: US 12,451,477 B1
(45) Date of Patent: Oct. 21, 2025

(54) CATHODE-CATHOLYTE CORE-SHELL STRUCTURES, COMPOSITE CATHODE LAYERS, AND SOLID-STATE BATTERIES, AND METHODS FOR MANUFACTURING OF THE SAME

(71) Applicant: Ampcera Inc., Milpitas, CA (US)

(72) Inventors: James Emery Brown, Tucson, AZ (US); Hui Emery Du, Tucson, AZ (US); Chen Chen, Tucson, AZ (US); Sumin Zhu, San Franscisco, CA (US)

(73) Assignee: Ampcera Inc., Milpitas, CA (US)

(*) Notice: Subject to any disclaimer, the term of this patent is extended or adjusted under 35 U.S.C. 154(b) by 450 days.

(21) Appl. No.: 17/552,925

(22) Filed: Dec. 16, 2021

Related U.S. Application Data

(60) Provisional application No. 63/126,316, filed on Dec. 16, 2020.

(51) Int. Cl.
*H01M 4/04* (2006.01)
*H01M 4/36* (2006.01)
*H01M 4/48* (2010.01)
*H01M 4/02* (2006.01)

(52) U.S. Cl.
CPC ......... *H01M 4/0419* (2013.01); *H01M 4/366* (2013.01); *H01M 4/483* (2013.01); *H01M 2004/021* (2013.01); *H01M 2004/028* (2013.01)

(58) Field of Classification Search
CPC ....... H01M 10/0562; H01M 2004/028; H01M 4/0419; C23C 24/04
See application file for complete search history.

(56) References Cited

U.S. PATENT DOCUMENTS

| 2004/0018430 A1* | 1/2004 | Holman | H01M 4/62 |
| | | | 429/232 |
| 2018/0138494 A1* | 5/2018 | Birt | H01M 4/382 |

FOREIGN PATENT DOCUMENTS

| CN | 111987316 | * 11/2020 |
| FR | 3046498 | * 7/2017 |
| KR | 20200052707 | * 5/2020 |

OTHER PUBLICATIONS

Sean P. Culver et al., Adv. Eng. Mater. (2019), 9, 1900626(1-14). (Year: 2019).*

* cited by examiner

*Primary Examiner* — Tabassom Tadayyon Eslami
(74) *Attorney, Agent, or Firm* — Walters & Wasylyna LLC

(57) ABSTRACT

A solid-state battery, including: an anode layer; a solid-state ionic conductive membrane layer; and a composite cathode layer formed onto a positive current collector using an energy-assisted solvent-free spray process. The composite cathode includes core-shell structures, wherein the core is the active cathode material, and the shell is a mixture of ionically conductive catholyte and an electronically conductive additive.

20 Claims, 6 Drawing Sheets

CATHODE-CATHOLYTE CORE-SHELL STRUCTURES, COMPOSITE CATHODE LAYERS, AND SOLID-STATE BATTERIES, AND METHODS FOR MANUFACTURING OF THE SAME

PRIORITY

The present invention claims the priority of U.S. Provisional Patent Application No. 63/126,316, filed Dec. 16, 2020, which is incorporated herein by reference in its entirety.

FIELD

The present application relates to the field of composite cathodes, in particular composite cathodes for solid-state batteries.

BACKGROUND

Solid-state batteries suffer from high cell impedance which hinders power rates and cycle life. The high impedance may originate in the composite cathode from 1) poor contact between the active intercalation cathode material and the ionically conductive catholyte material, 2) an unhomogenized mixture active cathode, catholyte and electronically conductive additive materials, and 3) the use of a binding polymer material.

Accordingly, those skilled in the art continue with research and development in the field of composite cathodes.

SUMMARY

In one embodiment, a solid-state battery includes: an anode layer; a solid-state ionic conductive membrane layer; and a composite cathode layer formed onto a positive current collector using an energy-assisted solvent-free spray process. The composite cathode includes core-shell structures, wherein the core is the active cathode material, and the shell is a mixture of ionically conductive catholyte and an electronically conductive additive.

In another embodiment, a solid-state battery, includes: an anode; a solid-state ionic conductive membrane; and a composite cathode formed onto a positive current collector using an energy-assisted solvent-free spray process. The composite cathode includes core-shell structures and a binding polymer, wherein the core is the active cathode material, and the shell is a mixture of ionically conductive catholyte and an electronically conductive additive.

In yet another embodiment, a method for manufacturing a solid-state battery includes: forming an anode layer; forming a solid-state ionic conductive membrane layer; and forming a composite cathode layer formed onto a positive current collector using an energy-assisted solvent-free spray process. The composite cathode includes core-shell structures, wherein the core is the active cathode material, and the shell is a mixture of ionically conductive catholyte and an electronically conductive additive.

In yet another embodiment, a method for manufacturing a solid-state battery includes: forming an anode; forming a solid-state ionic conductive membrane; and forming a composite cathode formed onto a positive current collector using an energy-assisted solvent-free spray process. The composite cathode includes core-shell structures and a binding polymer, wherein the core is the active cathode material, and the shell is a mixture of ionically conductive catholyte and an electronically conductive additive.

In yet another embodiment, a core-shell structure includes a partial shell around a core material, wherein the core material includes an intercalation active cathode material.

In yet another embodiment, a core-shell structure includes a substantially uniform shell around a core material, wherein the core material includes an intercalation active cathode material.

In yet another embodiment, a composite cathode layer includes a core-shell structure, the core-shell structure comprising a substantially uniform shell around a core material, wherein the core material includes an intercalation active cathode material.

In yet another embodiment, a solid state battery includes a composite cathode layer, the composite cathode layer comprising a core-shell structure, the core-shell structure comprising a substantially uniform shell around a core material, wherein the core material includes an intercalation active cathode material.

In yet another embodiment, a method for manufacturing a core-shell structure includes forming a partial shell around a core material, wherein the core material includes an intercalation active cathode material.

In yet another embodiment, a method for processing a core-shell structure that includes a partial shell around a core material, wherein the core material includes an intercalation active cathode material. The method includes energy-assisted solvent-free spraying of the core-shell structure to produce a core-shell structure comprising a substantially uniform shell around the core material.

In yet another embodiment, a method for manufacturing a composite cathode layer includes providing a core-shell structure comprising a partial shell around a core material, wherein the core material includes an intercalation active cathode material; and energy-assisted solvent-free spraying of the core-shell structure to produce a composite cathode layer comprising a core-shell structure comprising a substantially uniform shell around the core material.

In yet another embodiment, a method for manufacturing a solid state battery includes providing a core-shell structure comprising a partial shell around a core material, wherein the core material includes an intercalation active cathode material; and energy-assisted solvent-free spraying of the core-shell structure to produce a composite cathode layer of the solid state battery, the composite cathode layer comprising a core-shell structure comprising a substantially uniform shell around the core material.

Other embodiments of the disclosed methods and structures will become apparent from the following detailed description, the accompanying drawings and the appended claims.

DETAILED DESCRIPTION

Figure 1:
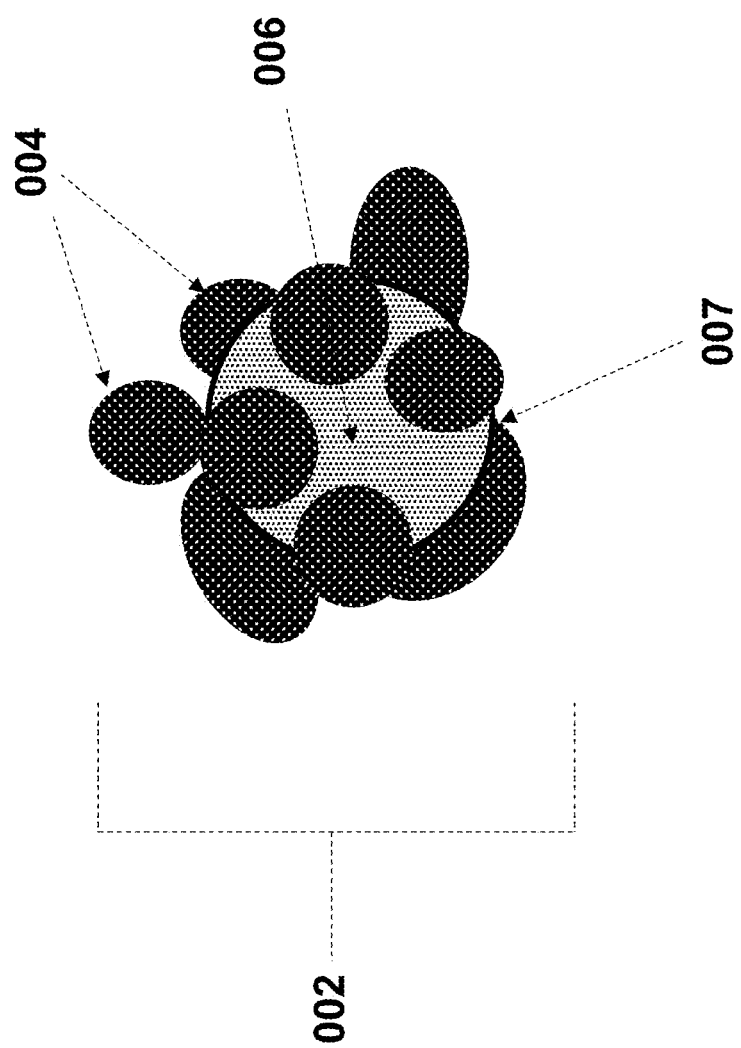
FIG. 1: A schematic representation of an intermediate core-shell structure, wherein an partial shell is formed onto the intercalation core material, coated with an ultrathin protective layer using a high impact mixing or milling process.

This invention relates to an intermediate core-shell structure, wherein the core-shell structure has an intermediate or partial shell around the core material, wherein the core includes an intercalation active cathode material coated with an ultra-thin protective layer and the partial shell includes an ionically conductive catholyte material premixed with an electronically conductive additive, wherein the partial core-shell structure is formed through mechanical mixing or milling of the aforementioned materials.

This invention further relates to a core-shell structure, wherein the core-shell structure has a more uniform shell around the core material, wherein the core includes an intercalation active cathode material coated with an ultra-thin protective layer and the shell includes a catholyte material premixed with an electronically conductive additive, wherein the core-shell structure is formed using an energy-assisted solvent-free spray process that uses the intermediate core-shell structure as a feedstock.

This invention further relates to the manufacturing of a binder-free composite cathode layer, wherein the composite cathode layer is composed of core-shell structures. The core includes an intercalation active cathode material coated with an ultra-thin protective layer and the shell includes a catholyte material premixed with an electronically conductive additive. The binder-free composite cathode layer is formed onto a positive current collector using an energy-assisted solvent-free spray process that uses the intermediate core-shell structure as a feedstock, wherein the core-shells and the binder-free composite cathode layer are formed simultaneously.

This invention further relates to the manufacturing of a binder-free solid-state battery, wherein the solid-state battery is composed of a binder-free composite cathode layer comprising of the core-shell structures, wherein a binder-free solid-state electrolyte layer is formed onto the composite cathode layer, wherein an binder-free anode layer is formed or laminated onto a binder-free solid-state electrolyte layer, wherein a negative current collector is formed or laminated onto the binder-free anode layer.

This invention further relates to the manufacturing of a composite cathode layer, wherein the composite cathode layer is composed of core-shell structures and a binding polymer. The core includes an intercalation active cathode material coated with an ultra-thin protective layer and the shell includes a catholyte material premixed with an electronically conductive additive. The composite cathode layer is formed onto a positive current collector using an energy-assisted solvent-free spray process that uses the intermediate core-shell structure mixed with a binding polymer as a feedstock, wherein the core-shells and composite cathode layer are formed simultaneously.

This invention further relates to the manufacturing of a solid-state battery, wherein the solid-state battery is composed of a composite cathode layer comprising of the core-shell structures and a binding polymer, wherein a solid-state electrolyte layer is formed or laminated onto the composite cathode layer, wherein an anode layer is formed or laminated onto a solid-state electrolyte layer, wherein a negative current collector is formed or laminated onto the anode layer.

Solid-state batteries suffer from high cell impedance which hinders power rates and cycle life. The high impedance may originate in the composite cathode from 1) poor contact between the active intercalation cathode material and the ionically conductive catholyte material, 2) an unhomogenized mixture of active cathode, catholyte and electronically conductive additive materials, and 3) the use of a binding polymer material.

To reduce cell impedance, the catholyte and electronically conductive materials can mixed to achieve a homogenous mixture. The homogenous mixture can then be used to form a partial shell layer around the active cathode material through a mechanical mixing or milling, forming an intermediate core-shell structure.

A more uniform shell can then be formed around the core material using an energy-assisted solvent-free spray process, wherein a high velocity impact with the substrate can deform the partial shell sufficiently enough to form a more uniform shell around the core through what has been described in the art as the peening effect.

A composite cathode layer can be formed onto a positive current collector using an energy-assisted solvent-free spray process, wherein a mixture of intermediate core-shell structures and a binding polymer is used as the feedstock, wherein the core-shell structures and the composite cathode layer are formed simultaneously.

A solid-state battery can then be manufactured in the following steps. First, forming or laminating a solid-state electrolyte layer onto the composite cathode layer. Second, forming or laminating an anode layer onto the solid-state electrolyte layer. Third, forming or laminating a negative current collector onto the anode layer.

Alternatively, and more preferably, to further reduce cell impedance, a binder-free composite cathode layer can be formed onto a positive current collector using an energy-assisted solvent-free spray process, wherein the intermediate core-shell structures are used as the feedstock, wherein the core-shell structures and the binder-free composite cathode layer are formed simultaneously.

A binder-free solid-state battery can then be manufactured in the following steps. First, forming a binder-free solid-state electrolyte layer onto the binder-free composite cathode layer. Second, forming or laminating a binder-free anode layer onto the binder-free solid-state electrolyte layer. Third, forming or laminating a negative current collector onto the binder-free anode layer.

In an embodiment, intermediate core-shell structures may be formed using a high-impact mixing or milling process.

In an aspect of the embodiment, the core of the intermediate core-shell structures may be composed of an active intercalation cathode material.

In another aspect of the embodiment, the active intercalation cathode material may be coated with a thin protective layer.

In yet another aspect of the embodiment, the shell of the intermediate core-shell structures may be composed of a mixture of an ionically conductive catholyte material and an electronically conductive additive.

In yet another aspect of the embodiment, the ionically conductive catholyte material and electronically conductive additive mixture may be premixed prior to a high-impact mixing or milling process.

In yet another aspect of the embodiment, a high-impact mixing or milling process may be used to form a partial shell around the intercalation active cathode core forming the intermediate core-shell structures.

In yet another aspect of the embodiment, an intermediate core-shell structure may be defined has having a lower surface energy at the interface of the core and shell materials than the surface of the core or shell material separately.

In yet another aspect of the embodiment, an intermediate core-shell structure may be further defined as having a shell layer that does not wet to the surface of the core material.

In yet another aspect of the embodiment, an intermediate core-shell structure may be further defined as having a shell layer that covers at least 25% of the core material surface.

In another embodiment, a core-shell structure may be formed using an energy-assisted solvent-free spray process.

In an aspect of the embodiment, an energy-assisted solvent-free spray process may use a feedstock comprising of the intermediate core-shell structures to form the core-shell structures.

In another aspect of the embodiment, an energy-assisted solvent-free spray process may include a low temperature process such cold spray.

In yet another aspect of the embodiment, an energy-assisted solvent-free spray process may include a high temperature process such as thermal spray. Thermal spray may include, for example, flame spray, plasma spray, wire arc spray, etc.

In yet another aspect of the embodiment, a core-shell structure may be formed during impact with the substrate, wherein the high velocity impact causes deformation of the shell material around the active core through what is referred to in the art as the peening effect, resulting in a more uniform shell layer.

In yet another aspect of the embodiment, a core-shell structure may be defined as having a higher surface energy at the interface of between the core and shell materials than the surface of the core or shell material separately.

In yet another aspect of the embodiment, a core-shell structure may be further defined as having a shell layer that wets to the surface of the core material.

In yet another aspect of the embodiment, a core-shell structure may be further defined as having a shell layer that covers at least 70% of the core material surface.

In yet another embodiment, a binder-free composite cathode layer may be formed onto a positive current collector using an energy-assisted solvent-free spray process.

In an aspect of the embodiment, a binder-free composite cathode layer may be formed using a feedstock comprising of the intermediate core-shell structures.

In another aspect of the embodiment, core-shell structures and the binder-free composite cathode layer may be formed simultaneously.

In another aspect of the embodiment, a positive current collector may include, for example, aluminum foil, carbon coated aluminum foil, etc.

In yet another embodiment, a binder-free solid-state battery may be manufactured using the binder-free composite cathode layer as a foundation.

In an aspect of the embodiment, a binder-free solid-state electrolyte layer may be formed onto the binder-free composite cathode layer using an energy-assisted solvent-free spray process.

In yet another aspect of the embodiment, a binder-free composite anode layer may be formed onto the binder-free solid-state electrolyte layer using an energy-assisted solvent-free spray process.

In yet another aspect of the embodiment, a negative current collector may be formed onto the binder-free composite anode layer using an energy-assisted solvent-free spray process. Alternatively, a negative current collector may be laminated onto the binder-free composite anode layer.

In yet another aspect of the embodiment, a lithium metal, or lithium metal alloy, film may be formed onto the binder-free solid-state electrolyte layer, followed by the formation of a negative current collector, in the case of a binder-free solid-state lithium metal battery. Alternatively, a lithium metal, or lithium metal alloy, film may be prelaminated onto a current collector and laminated onto the binder-free solid-state electrolyte layer, in the case of a binder-free solid-state lithium metal battery.

In yet another aspect of the embodiment, a current collector may by formed onto the binder-free solid-state electrolyte layer using an energy-assisted solvent-free spray process in the case of a binder-free anodeless or lithium-free solid-state battery. Alternatively, a current collector may be laminated onto a binder-free solid-state electrolyte layer in the case of a binder-free solid-state anodeless battery as an alternative.

In yet another embodiment, a composite cathode layer may be formed onto a positive current collector using an energy-assisted solvent-free spray process.

In an aspect of the embodiment, a composite cathode layer may be formed using a feedstock comprising a mixture of intermediate core-shell structures and a binding polymer.

In another aspect of the embodiment, core-shell structures and the composite cathode layer may be formed simultaneously.

In another aspect of the embodiment, a positive current collector may include, for example, aluminum foil, carbon coated aluminum foil, etc.

In yet another embodiment, a solid-state battery may be manufactured using the composite cathode layer as a foundation.

In an aspect of the embodiment, a solid-state electrolyte layer may be formed onto the composite cathode layer using an energy-assisted solvent-free spray process.

In another aspect of the embodiment, a freestanding solid-state electrolyte layer may be laminated onto the composite cathode layer as an alternative.

In yet another aspect of the embodiment, a composite anode layer may be formed onto the solid-state electrolyte layer using an energy-assisted solvent-free spray process. Alternatively, a composite anode layer may be prelaminated onto a negative current collector, wherein the prelaminated composite anode is laminated onto the solid-state electrolyte layer.

In yet another aspect of the embodiment, a negative current collector may be formed onto the composite anode layer using an energy-assisted solvent-free spray process. Alternatively, a negative current collector may be laminated onto the composite anode layer.

In yet another aspect of the embodiment, a lithium metal, or lithium metal alloy, film may be formed onto the solid-state electrolyte layer, followed by the formation of a negative current collector, in the case of a solid-state lithium metal battery. Alternatively, a lithium metal, or lithium metal alloy, film, may be prelaminated onto a current collector and laminated onto the solid-state electrolyte layer in the case of a solid-state lithium metal battery.

In yet another aspect of the embodiment, a current collector may by formed onto the solid-state electrolyte layer using an energy-assisted solvent-free spray process in the case of an anodeless or lithium-free solid-state battery. Alternatively, a current collector may be laminated onto a solid-state electrolyte layer in the case of an anodeless or lithium-free solid-state battery.

The present disclosure relates to materials comprising the core-shell structures.

A core-shell structure may be described as an intermediate structure with a partial shell around the core material formed through a high-impact mechanical mixing or milling process, wherein the shell covers at least 25% of the core material surface.

A core-shell structure may also be described as a structure with a more uniform shell coating around the core material formed using an energy-assisted solvent-free spray process that uses intermediate core-shell structures as the feedstock material, wherein the shell covers at least 70% of the core material surface.

The present description relates to the core of a core-shell structure.

The core of the core-shell structure may be composed of an active intercalation cathode material coated with a thin protective layer.

An active intercalation material may include, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide, $FeF_3$, LiSe.

In the case of a lithium intercalation, active materials may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

An active intercalation cathode material may have a particle size in the range of $0.05 \leq p \leq 250$ μm, with a preferred range of $0.1 \leq p \leq 25$ μm.

An active intercalation material may be coated with a protective layer to prevent reaction between the active cathode material and the catholyte or other components in the mixture, which includes, for example, lithium borate, lithium aluminate ($LiAlO_2$), lithium tungstate ($Li_2WO_4$), lithium niobium oxide ($LiNbO_3$), lithium phosphate ($Li_3PO_4$). lithium oxysulfide (LiAlSO, $Li_3PO_4$—$Li_2S$—$SiS_2$), lithium oxynitride (LiPON), etc.

In the case of elemental sulfur in powder form, the cathode material be encapsulated in various kinds of carbon products such as, for example, graphite, fluorene cages, carbon tubes, etc. The sulfur can also be encapsuled in other form of microscopically engineered structures to control their release and stability. In such as instance, the encapsulating carbon material may be consider as part of the core material.

The present description relates to the shell of a core-shell structure.

The shell of the core-shell structure may be composed of an ionically conductive catholyte and an electronically conductive additive mixture.

An ionically conductive catholyte may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

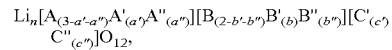

$Li_n[A_{(3-a'-a'')}A'_{(a')}A''_{(a'')}][B_{(2-b'-b'')}B'_{(b)}B''_{(b'')}][C'_{(c')}C''_{(c'')}]O_{12}$, a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii, wherein $0 \leq c' \leq 0.5$ and $0 \leq c'' \leq 0.4$; and d. wherein $n = 7 + a' + 2 \cdot a'' - b' - 2 \cdot b'' - 3 \cdot c' - 4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_2S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_m Y_4^{2-})Y_{2-x}^{2-}X_{x-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

In yet another example, a solid-state ionic conductive material includes argyrodites materials the general formula: $Li_{18-2m-x}(M_2^{m+}Y_7^{2-})\,Y_{2-x}^{2-}X_{x-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}+O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

A catholyte material may have a particle size in the range of $0.05 \leq p \leq 250$ μm, with a preferred range of $0.1 \leq p \leq 25$ μm.

A catholyte may have an ionic conductivity higher than $>10^{-7}$ S/cm, more preferably in the range of $>10^{-4}$ S/cm.

An electronically conductive additive may include, for example, graphene, reduced graphene oxide, carbon nanotubes, carbon black, Super P, acetylene black, carbon nanofibers, metal particles, etc.

An electronically conductive additive may include, for example, a conductive polymer such as polyaniline, polypyrrole, poly(3,4-ethylenedioxythiophene (PEDOT), polyphenylene vinylene etc.

An electronically conductive material may have an electronic conductivity higher than $>10^{-7}$ S/cm, more preferably in the range of $>10^{-4}$ S/cm.

The catholyte and electronically conductive material may be premixed prior to the processing of the intermediate core-shell structure.

Within the catholyte/electronically conductive additive mixture, a catholyte may have a weight percent in the range of $0.01 \leq w \leq 99.99\%$, with a preferred range of $80 \leq w \leq 99\%$.

Within the catholyte/electronically conductive additive mixture, an electronically conductive material may have a weight percent in the range of $0.1 \leq w \leq 99.9\%$, with a preferred range of $1 \leq w \leq 20\%$.

The present disclosure relate to the processing of intermediate core-shell structures.

Intermediate core-shell structures may be described as a structure with an active cathode core partially coated with an ionically conductive catholyte/electronically conductive additive shell, wherein at least 25% of the core material surface is covered.

The shell material, composed of an ionically conductive catholyte and an electronically conductive additive material, may be premixed prior to the formation of intermediate core-shell structures.

With respect to the active cathode material, the ionically conductive catholyte/electrically conductive additive mixture may have a weight percent in the range of $0.1\% \leq w \leq 99\%$, with a preferred range of $1\% \leq w \leq 90\%$.

A processing method may include, for example, mechanical mixing, wherein intermediate core-shell structure are formed by the mechanical mixing of the active cathode material and the ionically conductive catholyte/electronically conductive additive mixture.

A mechanical mixer may include, for example, a laboratory mixer, overhead stirrer, vortex, etc.

A mechanical mixing process may be dry or solvent-free process.

Alternatively, solvent may be added to the mechanical mixing process.

A solvent in the wet mixing process may include a polar solvent such as, for example, N-Methyl-2-pyrrolidone, dimethylformamide, etc.

Alternatively, a solvent in the wet mixing process may include a non-polar solvent such as, for example, benzene, hexane, toluene, etc.

Heat may be applied during the mechanical mixing process.

The forces applied during the mechanical mixing process may be sufficient to partially deform the ionically conductive catholyte/electronically conductive additive mixture, forming a partial shell around the active material core, forming an intermediate core-shell structure.

In the case of wet mechanical mixing, the resulting intermediate core-shell structures may be dried, or vacuum dried, to remove the solvent, forming a dry feedstock powder.

Intermediate core-shell structure may be formed by milling the active intercalation cathode material and the ionically conductive catholyte/electronically conductive additive mixture.

A milling process may include, for example, roller milling, planetary milling, etc.

A milling process may use milling jars composed of, for example, alumina, zirconia, stainless steel, tungsten carbide, agate, nylon, Teflon, polymer-based, etc.

A milling process may use milling media composed of, for example, alumina, zirconia, tungsten carbide, stainless steel, agate, etc.

A milling process may be dry or solvent-free.

Alternatively, a solvent may be added to the milling process.

A solvent in the wet milling process may include a polar solvent such as, for example, N-Methyl-2-pyrrolidone, dimethylformamide, etc.

Alternatively, a solvent in the wet milling process may include a non-polar solvent such as, for example, benzene, hexane, toluene, etc.

Heat may be applied during the milling process.

The forces applied during the milling process may be sufficient to partially deform the ionically conductive catholyte/electronically conductive additive mixture, forming a partial shell around the active material core, forming an intermediate core-shell structure.

In the case of wet milling, the resulting intermediate core-shell structures may be dried, or vacuum dried, to remove the solvent, forming a dry feedstock powder.

An intermediate core-shell structure may be defined has having a lower surface energy at the interface of the core and shell materials than the surface of the core or shell material separately.

An intermediate core-shell structure may be further defined as having a shell layer that does not wet to the surface of the core material.

An intermediate core-shell structure may be further defined as having a shell layer that covers at least 25% of the core material surface, more preferably 30% of the core material surface, more preferably 35% of the core material surface, more preferably 40% of the core material surface, more preferably 45% of the core material surface, more preferably 50% of the core material surface, etc.

The present disclosure relates to the processing of a core-shell structures to form a binder-free composite cathode layer.

An energy-assisted solvent-free spray process may be used to form a binder-free composite cathode layer, wherein the binder-free composite cathode layer and the core-shell structures are formed simultaneously.

A core-shell structure may be defined as having a higher surface energy at the interface between the core and shell materials than the surface of the core or shell material separately.

A core-shell structure may be further defined as having a shell layer that wets to the surface of the core material.

A core-shell structure may be further defined as having a shell layer that covers at least 70% of the core material surface, more preferably 75% of the core material surface, more preferably 80% of the core material surface, more preferably 85% of the core material surface, more preferably 90% of the core material surface, more preferably 95% of the core material surface, etc.

An energy-assisted solvent-free spray process may use intermediate core-shells structures as the feedstock.

An energy-assisted solvent-free spray process may include a low temperature spray processing method such as, for example, cold spray.

A cold spray method may include, for example, supersonic particle deposition, wherein a high-pressure carrier gas is used to accelerate the feedstock particles at supersonic speeds toward the substrate (i.e. current collector), enabling a more uniform shell layer on the core-shell structures upon impact, wherein the high-pressure gas provides an energy assistance in the form of kinetic energy.

A cold spray method may include, for example, subsonic particle deposition, wherein a low-pressure carrier gas is used to accelerate the feedstock particles at subsonic speeds toward the substrate (i.e. current collector), enabling a more uniform shell layer on the core-shell structures upon impact, wherein the low-pressure gas provides an energy assistance in the form of kinetic energy.

An energy-assisted solvent-free spray process may include a high temperature spray processing method such as, for example, thermal spray.

Thermal spray methods may include, for example, plasma spray, flame spray, wire arc spray, high velocity oxy-fuel spray, etc.

In thermal spray, a high temperature flame (or plasma) is used to soft the feedstock particles enabling a more uniform shell layer on the core-shell structures, wherein the flame (or plasma) provides an energy assistance in the form of thermal energy.

An energy-assisted solvent-free spray process may be done in ambient conditions.

An energy-assisted solvent-free spray process may be done under vacuum.

An energy-assisted solvent-free spray process may be done under inert conditions.

An energy-assisted solvent-free spray process may be done in a dry room.

An energy-assisted solvent-free spray process may be done in a roll-to-roll process.

An energy-assisted solvent-free spray process may be used to form a binder-free composite cathode layer onto a positive current collector such as, for example, aluminum foil or carbon coated aluminum foil, wherein the current collector serves as a substrate.

Heat may be applied to the current collector with a temperature in the range of $0 \leq T \leq 1000°$ C., with a preferred range of $25 \leq T \leq 350°$ C.

A feedstock of intermediate core-shell structures may be sprayed onto a positive current collector using a single spray nozzle.

The feedstock may impact the positive current collector at high velocity, wherein the forces associated with the energy-assisted spray process may be sufficient to deform the partial ionically conductive catholyte/electronically conductive additive shell, forming a more uniform shell around the active core material, forming the core-shell structure.

The feedstock may impact the positive current collector at high velocity, wherein the forces associated with the energy-assisted spray process may be sufficient to deform the partial ionically conductive catholyte/electronically conductive additive shell, forming a more uniform shell around the active core material, forming the binder-free composite cathode layer.

A single spray nozzle may be scanned in a raster fashion to increase the geometric surface area of the binder-free composite cathode layer.

A single spray nozzle may be raster scanned over the same geometric surface more than once, wherein the feedstock may impact a previously formed layer of core-shell structures at high velocity, wherein the forces associated with the energy-assisted spray process may be sufficient to deform the partial ionically conductive catholyte/electronically conductive additive shell, forming an additional layer of core-shell structures. In such an instance, the number of raster passes may be used to control the thickness of the binder-free composite cathode layer.

A feedstock may be sprayed onto a positive current collector using two or more spray nozzles moving in a raster fashion, wherein the first spray nozzle is used to form a first layer of core-shell structures onto a positive current collector, wherein the one or more subsequent spray nozzles are used to form additional layers of core-shell structures onto the first layer to form thicker binder-free composite cathode layers. In such an instance, the number of spray nozzles may be used to control the thickness of the binder-free composite cathode layer.

The present disclosure relates to the processing of a binder-free solid-state battery.

A binder-free solid-state battery may be manufactured using a binder-free composite cathode layer as a foundation.

A binder-free solid-state battery may comprise of a binder-free solid-state electrolyte layer formed onto a binder-free composite cathode layer using an aforementioned energy-assisted solvent-free spray processing method.

A binder-free solid-state battery may comprise of a binder-free composite anode layer formed onto a binder-free solid-state electrolyte layer using an aforementioned energy-assisted solvent-free spray processing method.

A binder-free solid-state battery may comprise of a negative current collector formed onto a binder-free composite anode layer using an aforementioned energy-assisted solvent-free spray processing method. Alternatively, a negative current may be laminated onto a binder-free composite anode layer.

A binder-free solid-state lithium metal battery may be manufactured using a binder-free composite cathode layer as a foundation.

A binder-free solid-state lithium metal battery may comprise of a binder-free solid-state electrolyte layer formed onto a binder-free composite cathode layer using an aforementioned energy-assisted solvent-free spray processing method.

A binder-free solid-state lithium metal battery may comprise of a lithium metal, or lithium metal alloy, film as the anode, wherein the film is formed onto a binder-free solid-state electrolyte layer using an aforementioned energy-assisted solvent-free spray processing method. Alternatively, a lithium metal, or lithium metal alloy, film may be laminated onto a binder-free solid-state electrolyte layer, wherein the film is prelaminated onto a negative current collector.

A binder-free solid-state lithium metal battery may comprise of a negative current collector formed onto a lithium metal, or lithium metal alloy, film using an aforementioned energy-assisted solvent-free spray processing method. Alternatively, a negative current may be laminated onto a lithium metal, or lithium metal alloy, film.

An binder-free anodeless or lithium-free solid-state battery may be manufactured using a binder-free composite cathode layer as a foundation.

A binder-free anodeless or lithium-free solid-state battery may comprise of a binder-free solid-state electrolyte layer formed onto a binder-free composite cathode layer using an aforementioned energy-assisted solvent-free spray processing method.

A binder-free anodeless or lithium-free solid-state battery may comprise of a negative current collector formed onto a binder-free solid-state electrolyte layer using an aforementioned energy-assisted solvent-free spray processing method. Alternatively, a negative current may be laminated onto a binder-free solid-state electrolyte layer.

The present disclosure relates to the processing of a core-shell structures to form a composite cathode layer.

An energy-assisted solvent-free spray process may be used to form the composite cathode layer, wherein the composite cathode layer and the core-shell structures are formed simultaneously.

A core-shell structure may be defined as having a higher surface energy at the interface between the core and shell materials than the surface of the core or shell material separately.

A core-shell structure may be further defined as having a shell layer that wets to the surface of the core material.

A core-shell structure may be further defined as having a shell layer that covers at least 70% of the core material surface, more preferably 75% of the core material surface, more preferably 80% of the core material surface, more preferably 85% of the core material surface, more preferably 90% of the core material surface, more preferably 95% of the core material surface, etc.

An energy-assisted solvent-free spray process may use intermediate core-shells structures and a binding polymer mixture as the feedstock.

A binding polymer may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

With respect to the intermediate core-shell structures, a binding polymer may have a weight percent in the range $0.1\% \leq w \leq 20\%$, with a preferred range of $1\% \leq w \leq 5\%$.

An energy-assisted solvent-free spray process may include a low temperature spray processing method such as, for example, cold spray.

A cold spray method may include, for example, supersonic particle deposition, wherein a high-pressure carrier gas is used to accelerate the feedstock particles at supersonic speeds toward the substrate (i.e. current collector), enabling a more uniform shell layer on the core-shell structures upon impact, wherein the high-pressure gas provides an energy assistance in the form of kinetic energy.

A cold spray method may include, for example, subsonic particle deposition, wherein a low-pressure carrier gas is used to accelerate the feedstock particles at subsonic speeds toward the substrate (i.e. current collector), enabling a more uniform shell layer on the core-shell structures upon impact, wherein the low-pressure gas provides an energy assistance in the form of kinetic energy.

An energy-assisted solvent-free spray process may include a high temperature spray processing method such as, for example, thermal spray.

Thermal spray methods may include, for example, plasma spray, flame spray, wire arc spray, high velocity oxy-fuel spray, etc.

In thermal spray, a high temperature flame (or plasma) is used to soft the feedstock particles enabling a more uniform shell layer on the core-shell structures, wherein the flame (or plasma) and carrier gas provides an energy assistance in the form of both thermal and kinetic energy.

An energy-assisted solvent-free spray process may be done in ambient conditions.

An energy-assisted solvent-free spray process may be done under vacuum.

An energy-assisted solvent-free spray process may be done under inert conditions.

An energy-assisted solvent-free spray process may be done in a dry room.

An energy-assisted solvent-free spray process may be done in a roll-to-roll process.

An energy-assisted solvent-free spray process may be used to form the composite cathode layer onto a positive current collector such as, for example, aluminum foil or carbon coated aluminum foil, wherein the current collector serves as a substrate.

Heat may be applied to the current collector with a temperature in the range of $0 \leq T \leq 1000°$ C., with a preferred range of $25 \leq T \leq 350°$ C.

In an example, an energy-assisted solvent-free spray process may utilize a single feedstock composed of intermediate core-shells structures and a binding polymer mixture, wherein the two components are premixed at specific weight ratios prior to spray processing.

In an aspect of the example, a feedstock mixture may be sprayed onto a positive current collector using a single spray nozzle.

In another aspect of the example, the single feedstock may impact the positive current collector at high velocity, wherein the forces associated with the energy-assisted spray process may be sufficient to deform the partial ionically conductive catholyte/electronically conductive additive shell, forming a more uniform shell around the active core material, forming the core-shell structure.

In yet another aspect of the example, the single feedstock may impact the positive current collector at high velocity, wherein the forces associated with the energy-assisted spray process may be sufficient to deform the partial ionically conductive catholyte/electronically conductive additive shell, forming a more uniform shell around the active core material, forming the composite cathode layer.

In yet another aspect of the example, a single spray nozzle may be scanned in a raster fashion to form a composite cathode layer of larger geometric surface area.

In yet another aspect of the example, a single spray nozzle may be raster scanned over the same geometric surface more than once, wherein the single feedstock may impact a previously formed layer of core-shell structures at high velocity, wherein the forces associated with the energy-assisted spray process may be sufficient to deform the partial ionically conductive catholyte/electronically conductive additive shell, forming an additional layer of core-shell structure. In such an instance, the number of raster passes may be used to control the thickness of the composite cathode layer.

In yet another aspect of the example, a feedstock mixture may be sprayed onto a positive current collector using two or more spray nozzles moving in raster form, wherein the first spray nozzle is used to form a first layer of core-shell structures onto a positive current collector, wherein the one or more subsequent spray nozzles are used to form additional layers of core-shell structures onto the first layer to form thicker composite cathode layers. In such an instance, the number of spray nozzles may be used to control the thickness of the composite cathode layer.

In another example, an energy-assisted solvent-free spray process may utilize two separate feedstocks with one composed of intermediate core-shells structures and the other a binding polymer, wherein the feedstocks are fed to one or more spray nozzles at specific flow rates to obtain desired weight ratios.

In an aspect of the example, the feedstocks may be sprayed onto a positive current collector using a single spray nozzle.

In another aspect of the example, the feedstocks may impact the positive current collector at high velocity, wherein the forces associated with the energy-assisted spray process may be sufficient to deform the partial ionically conductive catholyte/electronically conductive additive shell, forming a more uniform shell around the active core material, forming the core-shell structure.

In yet another aspect of the example, the feedstocks may impact the positive current collector at high velocity, wherein the forces associated with the energy-assisted spray process may be sufficient to deform the partial ionically conductive catholyte/electronically conductive additive shell, forming a more uniform shell around the active core material, forming the composite cathode layer.

In yet another aspect of the example, a single spray nozzle may be scanned in a raster fashion to increase the geometric surface area of the composite cathode layer.

In yet another aspect of the example, a single spray nozzle may be raster scanned over the same geometric surface more than once, wherein the feedstocks may impact a previously formed layer of core-shell structures at high velocity, wherein the forces associated with the energy-assisted spray process may be sufficient to deform the partial ionically conductive catholyte/electronically conductive additive shell, forming an additional layer of core-shell structure. In such an instance, the number of raster passes may be used to control the thickness of the composite cathode layer.

In yet another aspect of the example, the feedstocks may be sprayed onto a positive current collector using two or more spray nozzles moving in raster form, wherein the first spray nozzle is used to form a first layer of core-shell structures onto a positive current collector, wherein the one or more subsequent spray nozzles are used to form additional layers of core-shell structures onto the first layer to form thicker composite cathode layers. In such an instance, the number of spray nozzles may be used to control the thickness of the composite cathode layer.

The present disclosure relates to the processing of a solid-state battery.

A solid-state battery may be manufactured using a composite cathode layer as a foundation.

A solid-state battery may comprise of a solid-state electrolyte layer formed onto a composite cathode layer using an aforementioned an energy-assisted solvent-free spray processing method. Alternatively, a solid-state battery may comprise of a freestanding solid-state electrolyte layer laminated onto a composite cathode layer, wherein the freestanding solid-state electrolyte is preferably a ceramic-polymer composite solid-state electrolyte.

A solid-state battery may comprise of a composite anode layer formed onto a solid-state electrolyte layer using an aforementioned an energy-assisted solvent-free spray processing method. Alternatively, a composite anode layer may be laminated onto a solid-state electrolyte layer, wherein the composite anode layer is prelaminated onto a negative current collector.

A solid-state battery may comprise of a negative current collector formed onto a composite anode layer using an aforementioned an energy-assisted solvent-free spray processing method. Alternatively, a negative current may be laminated onto a composite anode layer.

A solid-state lithium metal battery may be manufactured using a composite cathode layer as a foundation.

A solid-state lithium metal battery may comprise of a solid-state electrolyte layer formed onto a composite cathode layer using an aforementioned an energy-assisted solvent-free spray processing method. Alternatively, a solid-state lithium metal battery may comprise of a freestanding solid-state electrolyte layer laminated onto a composite cathode layer, wherein the freestanding solid-state electrolyte is preferably a ceramic-polymer composite solid-state electrolyte.

A solid-state lithium metal battery may comprise of a lithium metal, or lithium metal alloy, film as the anode, wherein the film is formed onto a solid-state electrolyte layer using an aforementioned an energy-assisted solvent-free spray processing method. Alternatively, a lithium metal, or lithium metal alloy, film may be laminated onto a solid-state electrolyte layer, wherein the film is prelaminated onto a negative current collector.

A solid-state lithium metal battery may comprise of a negative current collector formed onto a lithium metal, or lithium metal alloy, film using an aforementioned an energy-assisted solvent-free spray processing method. Alternatively, a negative current may be laminated onto a lithium metal, or lithium metal alloy, film.

An anodeless or lithium-free solid-state battery may be manufactured using a composite cathode layer as a foundation.

An anodeless solid-state battery may comprise of a solid-state electrolyte layer formed onto a composite cathode layer using an aforementioned an energy-assisted solvent-free spray processing method. Alternatively, an anodeless solid-state battery may comprise of a freestanding solid-state electrolyte layer laminated onto a composite cathode layer, wherein the freestanding solid-state electrolyte is preferably a ceramic-polymer composite solid-state electrolyte.

An anodeless solid-state battery may comprise of a negative current collector formed onto a solid-state electrolyte layer using an aforementioned an energy-assisted solvent-free spray processing method. Alternatively, a negative current may be laminated onto a solid-state electrolyte layer.

The present disclosure relates to materials comprising a solid-state electrolyte layer in a solid-state battery, or more preferably a binder-free solid-state electrolyte layer in a binder-free solid-state battery.

A solid-state electrolyte layer, or more preferably a binder-free solid-state electrolyte layer may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

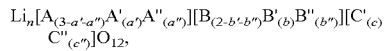

a. where A, A', and A'' stand for a dodecahedral position of the crystal structure, i. where A stands for one or more trivalent rare earth elements, ii. where A' stands for one or more alkaline earth elements, iii. where A'' stands for one or more alkaline metal elements other than Li, and iv, wherein $0 \leq a' \leq 2$ and $0 \leq a'' \leq 1$;

b. where B, B', and B'' stand for an octahedral position of the crystal structure, i. where B stands for one or more tetravalent elements, ii. where B' stands for one or more pentavalent elements, iii. where B'' stands for one or more hexavalent elements, and iv, wherein $0 \leq b'$, $0 \leq b''$, and $b'+b'' \leq 2$;

c. where C' and C'' stand for a tetrahedral position of the crystal structure, i. where C' stands for one or more of Al, Ga, and boron, ii. where C'' stands for one or more of Si and Ge, and iii, wherein $0 \leq c' \leq 0.5$ and $0 \leq c'' \leq 0.4$; and d. wherein $n=7+a'+2 \cdot a''-b'-2 \cdot b''-3 \cdot c'-4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_{x-}$; wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

In yet another example, a solid-state ionic conductive material includes argyrodites materials the general formula: $Li_{18-2m-x}(M_2^{m+}Y_7^{2-})Y_{2-x}^{2-}X_{x-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

A solid-state electrolyte layer may further contain a binding polymer. A binding polymer may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly($\epsilon$-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

A polymer binder in a solid-state electrolyte layer may contain an ionic conducting salt. An ionic conducting salt may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato)borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KASF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$, $KNO_3$, $Al(NO_3)_2$, $AlCl_3$, $Al_2(SO_4)_3$, $AlBr_3$, $AlI_3$, AlN, AlSCN, $Al(ClO_4)_3$.

The present disclosure relates to materials comprising a composite anode layer in a solid-state battery, or more preferably a binder-free composite anode layer in a binder-free solid-state battery.

A composite anode layer, or more preferably a binder-free composite anode layer may be composed of, for example, an active anode material, an electronic conducting material, and an ionic conducting material as the anolyte.

An active anode material in a composite anode layer, or more preferably a binder-free composite anode layer may include, for example, graphite, titanate, titanium oxide, silicon, tin oxide, lithium powder, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

An active anode material may be coated with a protective layer to prevent reaction between the active cathode material and the catholyte or other components in the mixture, which includes, lithium borate, lithium aluminate ($LiAlO_2$), lithium tungstate ($Li_2WO_4$), lithium niobium oxide ($LiNbO_3$), lithium phosphate ($Li_3PO_4$). lithium oxysulfide (LiAlSO, $Li_3PO_4$—$Li_2S$—$SiS_2$), lithium oxynitride (LiPON), etc.

An electronic conducting material may include, for example, graphene, reduced graphene oxide, carbon nanotubes, carbon black, Super P, acetylene black, carbon nanofibers, etc.

An ionic conducting material, or anolyte, may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

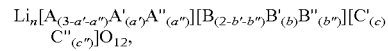

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein $0 \le a' \le 2$ and $0 \le a" \le 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein $0 \le b'$, $0 \le b"$, and $b'+b" \le 2$;

c. where C' and C" stand for a tetrahedral position of the crystal structure, i. where C' stands for one or more of Al, Ga, and boron, ii. where C" stands for one or more of Si and Ge, and iii, wherein $0 \le c' \le 0.5$ and $0 \le c" \le 0.4$; and d. wherein $n=7+a'+2 \cdot a"-b'-2 \cdot b"-3 \cdot c'-4 \cdot c"$ and $4.5 \le n \le 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_{x-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

In yet another example, a solid-state ionic conductive material includes argyrodites materials the general formula: $Li_{18-2m-x}(M_2^{m+}Y_7^{2-})Y_{2-x}^{2-}X_{x-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof, $X^-=F^-$, $Cl^-$, $Br^-$, $I^-$, or a combination thereof; and x is in the range of $0 \leq x \leq 2$.

A composite anode layer may further contain a binding polymer. An example of a binding polymer may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

A binding polymer may contain an ionic conducting salt. An example of an ionic conducting salt may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato)borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$, $KNO_3$, $Al(NO_3)_2$, $AlCl_3$, $Al_2(SO_4)_3$, $AlBr_3$, $AlI_3$, $AlN$, $AlSCN$, $Al(ClO_4)_3$.

The present disclosure relates to materials comprising a lithium metal, or lithium metal alloy, film in a solid-state lithium metal battery, or more preferably a binder-free solid-state lithium metal battery.

A lithium metal film may be composed of metallic lithium.

A lithium metal film may be formed onto a solid-state electrolyte layer, or more preferably a binder-free solid-state electrolyte layer using thermal evaporation.

A lithium metal film may be formed onto a solid-state electrolyte layer, or more preferably a binder-free solid-state electrolyte layer using an energy-assisted solvent-free spray process, wherein lithium powder is the feedstock material.

A lithium metal film may be formed onto a negative current collector, such as copper or stainless steel, using thermal evaporation, wherein the film is laminated onto a solid-state electrolyte layer, or more preferably a binder-free solid-state electrolyte layer.

A lithium metal film may be formed onto a negative current collector, such as copper or stainless steel, using an energy-assisted solvent-free spray process, wherein lithium powder is the feedstock material, wherein the film is laminated onto a solid-state electrolyte layer, or more preferably a binder-free solid-state electrolyte layer.

In some instances, an ionically conductive anolyte material may be mixed with the lithium powder to form a composite lithium metal film, wherein an energy-assisted solvent-free spray process is used to form the composite film.

A lithium metal alloy film may be composed of metallic lithium and an alloy material. An alloy material may include, for example, indium, tin, zinc, magnesium, etc.

A lithium metal alloy film may be formed onto a solid-state electrolyte layer, or more preferably a binder-free solid-state electrolyte layer using thermal evaporation.

A lithium metal alloy film may be formed onto a solid-state electrolyte layer, or more preferably a binder-free solid-state electrolyte layer using an energy-assisted solvent-free spray process, wherein the feedstock is composed of a mixture of lithium powder and alloy powder.

A lithium metal alloy film may be formed onto a negative current collector, such as copper or stainless steel, using thermal evaporation, wherein the alloy film is laminated onto a solid-state electrolyte layer, or more preferably a binder-free solid-state electrolyte layer.

A lithium metal alloy film may be formed onto a negative current collector, such as copper or stainless steel, using an energy-assisted solvent-free spray process, wherein the feedstock is composed of a mixture of lithium powder and alloy powder, wherein the alloy film is laminated onto a solid-state electrolyte layer, or more preferably a binder-free solid-state electrolyte layer.

In some instances, an ionically conductive anolyte material may be mixed with the lithium powder and alloy to form a composite lithium metal alloy film, wherein a an energy-assisted solvent-free spray process is used to form the composite alloy film.

The drawings of the present disclosure further describe examples of the core-shell structure and related battery systems.

FIG. 1: A schematic representation of an intermediate core-shell structure (002), wherein an partial shell (004) is formed onto the intercalation core material (006), coated with an ultrathin protective layer (007) using a high impact mixing or milling processes.

Figure 2:
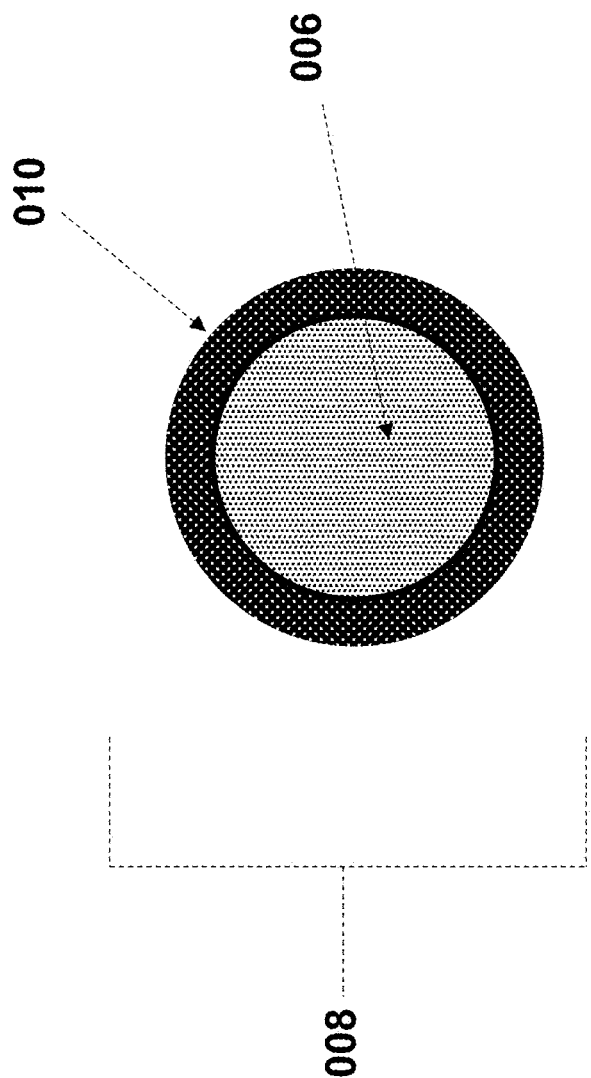
FIG. 2: A schematic representation of a core-shell structure with a preferred 100% surface area coverage, wherein a catholyte/electronically conductive additive shell is formed onto the intercalation core material using an energy-assisted solvent-free spray process.

FIG. 2: A schematic representation of a core-shell structure with a preferred 100% surface area coverage (008), wherein a catholyte/electronically conductive additive shell (010) is formed onto the intercalation core material (006) using an energy-assisted solvent-free spray process.

Figure 3:
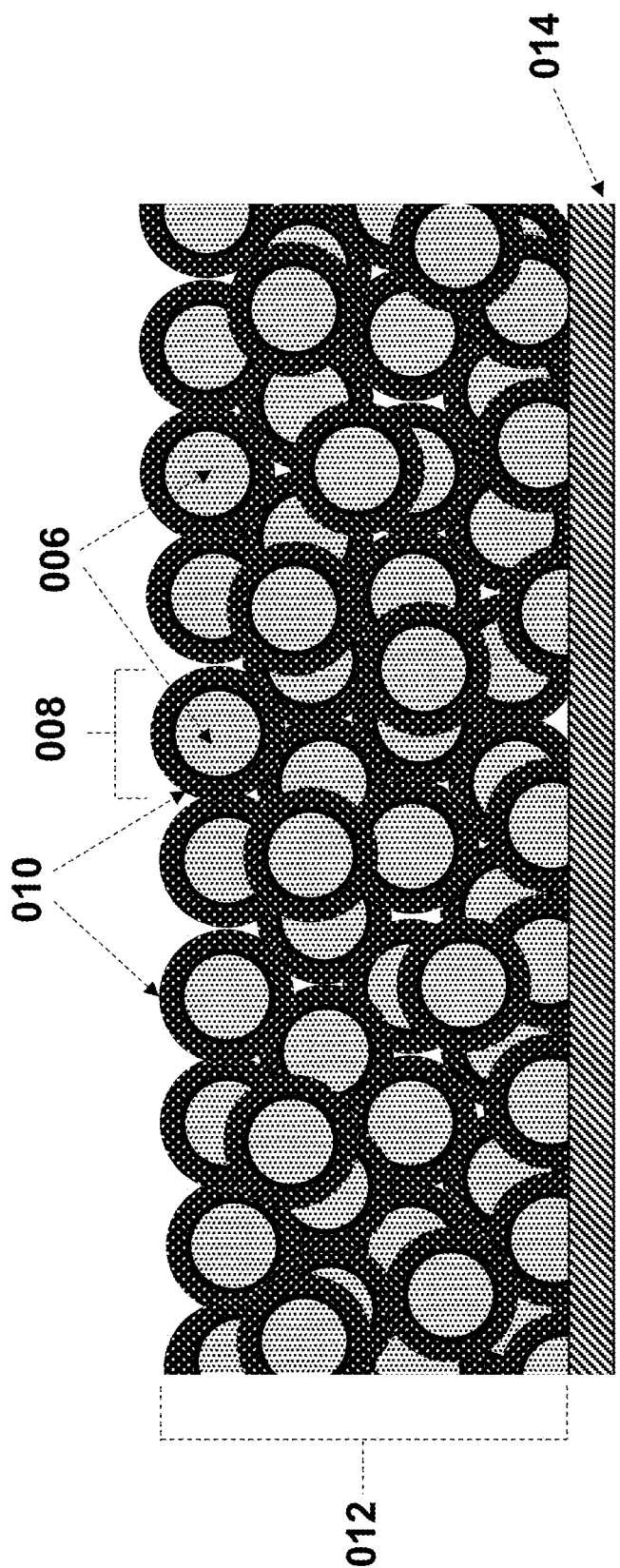
FIG. 3: A schematic representation of a composite cathode layer, or more preferably a binder-free composite cathode layer, where the layer is composed of core-shell structures comprising of a catholyte/electronically conductive additive shell encapsulating an intercalation core material, wherein the layer is formed onto a positive current collector using an energy-assisted solvent-free spray process.

FIG. 3: A schematic representation of a composite cathode layer, or more preferably a binder-free composite cathode layer (012), where the layer is composed of core-shell structures (008) comprising of a catholyte/electronically conductive additive shell (010) encapsulating an intercalation core material (006), wherein the layer is formed onto a positive current collector (014) using an energy-assisted solvent-free spray process.

Figure 4:
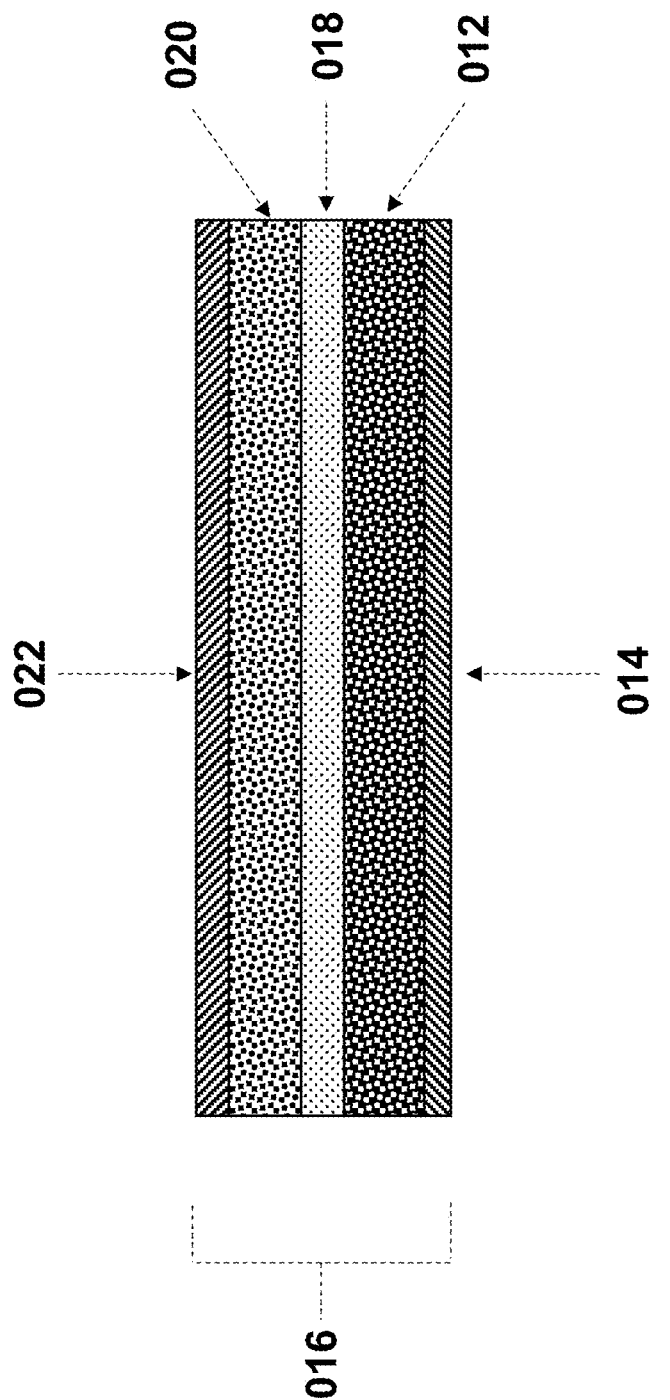
FIG. 4: A schematic illustration of a solid-state battery, or more preferably a binder-free solid-state battery, wherein a composite cathode layer, or more preferably a binder-free composite cathode layer is formed onto a positive current collector using an energy-assisted solvent-free spray process.

FIG. 4: A schematic illustration of a solid-state battery, or more preferably a binder-free solid-state battery (016), wherein a composite cathode layer, or more preferably a binder-free composite cathode layer (012) is formed onto a positive current collector (014) using an energy-assisted solvent-free spray process. A solid-state electrolyte layer, or more preferably a binder-free solid-state electrolyte (018) is formed or laminated onto a composite cathode layer, or more preferably a binder-free composite cathode layer (012). A composite anode layer, or more preferably a binder-free composite anode layer (020) is formed or laminated onto a solid-state electrolyte layer, or more preferably a binder-free solid-state electrolyte layer (018). A negative current collector (022) is formed or laminated onto a composite anode layer, or more preferably a binder-free composite anode layer (020).

Figure 5:
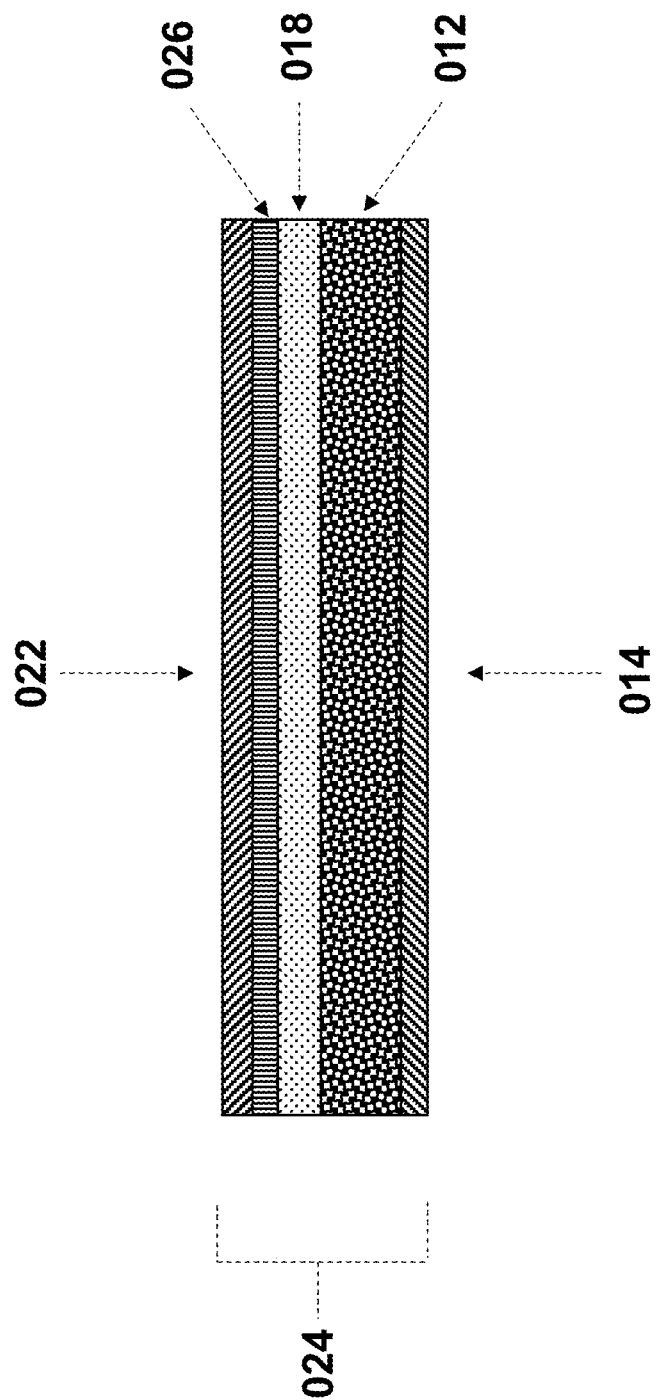
FIG. 5: A schematic illustration of a solid-state lithium metal battery, or more preferably a binder-free solid-state lithium metal battery, wherein a composite cathode layer, or more preferably a binder-free composite cathode layer is formed onto a positive current collector using an energy-assisted solvent-free spray process.

FIG. 5: A schematic illustration of a solid-state lithium metal battery, or more preferably a binder-free solid-state lithium metal battery (024), wherein a composite cathode layer, or more preferably a binder-free composite cathode layer (012) is formed onto a positive current collector (014) using an energy-assisted solvent-free spray process. A solid-state electrolyte layer, or more preferably a binder-free solid-state electrolyte (018) is formed or laminated onto a composite cathode layer, or more preferably a binder-free composite cathode layer (012). A lithium metal, or lithium metal alloy, film (026) is formed onto a solid-state electrolyte layer, or more preferably a binder-free solid-state electrolyte layer (018). Alternative, a lithium metal, or lithium metal alloy, film (026), prelaminated onto a negative current collector (022), is laminated onto a solid-state electrolyte layer, or more preferably a binder-free solid-state electrolyte layer (018).

Figure 6:
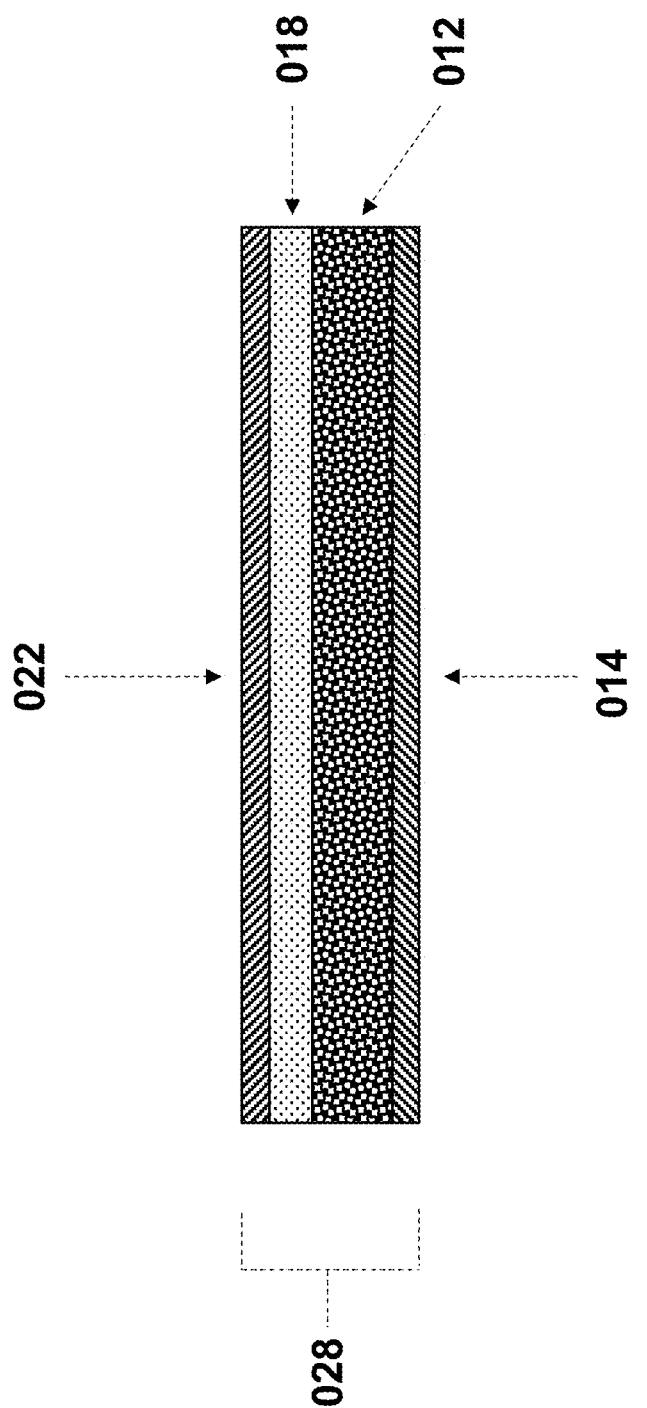
FIG. 6: A schematic illustration of a solid-state anodeless battery, or more preferably a binder-free solid-state anodeless battery, wherein a composite cathode layer, or more preferably a binder-free composite cathode layer is formed onto a positive current collector using an energy-assisted solvent-free spray process.

FIG. 6: A schematic illustration of a solid-state anodeless battery, or more preferably a binder-free solid-state anodeless battery (028), wherein a composite cathode layer, or more preferably a binder-free composite cathode layer (012) is formed onto a positive current collector (014) using an energy-assisted solvent-free spray process. A solid-state electrolyte layer, or more preferably a binder-free solid-state electrolyte (018) is formed or laminated onto a composite cathode layer, or more preferably a binder-free composite cathode layer (012). A negative current collector (022) is formed or laminated onto the solid-state electrolyte layer, or more preferably a binder-free solid-state electrolyte layer (018).

The above-described systems and methods can be ascribed to secondary solid-state batteries with chemistries beyond lithium which may include, for example, sodium ion-based solid-state batteries, aluminum ion-based solid-state batteries, magnesium ion-based solid-state batteries, iron ion-based solid-state batteries, potassium ion-based solid-state batteries, etc.

The above-described systems and methods can be ascribed to various solid-state battery designs such as, for example, a solid-state pouch cell, a solid-state coil cell, a solid-state button cell, a solid-state cylindrical cell, a solid-state prismatic cell, etc.

The above-described systems and methods can be ascribed to solid-state batteries with the end use applications such as, for example, electric vehicles, hybrid electric vehicles, mobile devices, handheld electronics, consumer electronics, medical, medical wearables, and wearables for portable energy storage.

The above-described systems and methods can be ascribed to solid-state batteries for grid scale energy storage backup systems.

The above described systems and methods can be ascribed to secondary batteries for longevity, higher energy density and power density and improved safety.

In the drawings, the following reference numbers are noted:
  002 Intermediate core-shell structure
  004 Partial catholyte/electronically conductive additive shell
  006 Intercalation core material
  007 Protective layer
  008 Core-shell structure
  010 Ionically conductive catholyte/electronically conductive additive shell
  012 Composite cathode layer/binder-free composite cathode layer
  014 Positive current collector
  016 Solid-state battery/binder-free solid-state battery
  018 Solid-state electrolyte layer/binder-free composite cathode layer
  020 Composite anode layer/binder-free composite anode layer
  022 Negative current collector/negative current collector layer
  024 Solid-state lithium metal battery/binder-free solid-state battery
  026 Lithium metal, or lithium metal alloy, film 028 Anodeless solid-state battery/binder-free anodeless solid-state battery Although various embodiments of the disclosed methods and structure have been shown and described, modifications may occur to those skilled in the art upon reading the specification. The present application includes such modifications and is limited only by the scope of the claims.

What is claimed is:

1. A method for manufacturing a solid-state battery, the method comprising:
   forming an anode layer;
   forming a solid-state ionic conductive membrane layer; and
   forming a composite cathode layer formed onto a positive current collector using an energy-assisted solvent-free spray process, the composite cathode comprising:
   core-shell structures, wherein the core is the active cathode material, and the shell is a mixture of ionically conductive catholyte and an electronically conductive additive.

2. The method of claim 1, wherein the core material of the core-shell structure comprises at least one intercalation material with the general structure $YMO_2$, $Y_{1+x}M_{1-x}O_2$, $YM_2O_4$, $YMPO_4$, $Y_2MSiO_4$, $YMBO_3$, or $YMPO_4F$, where M is Fe, Co, Ni, Mn, Cu, Cr, and where Y is Li, Na, K, Mg, Zn, Al.

3. The method of claim 1, wherein the shell material of the core-shell structure comprises at least one of a garnet-structure oxide material, a NASICON-structured material, a perovskite type oxide material, an anti-perovskite-type oxide material, a thiophosphate material, and an argyrodite structured sulfide.

4. The method of claim 1, wherein the shell material of the core-shell structure comprises at least one electronically conductive carbon material or metallic material.

5. The method of claim 1, wherein the core-shell structure has a shell coverage of at least 70% of the core material surface area.

6. The method of claim 1, wherein a composite cathode layer is formed onto a positive current collector such as aluminum foil or carbon coated aluminum foil.

7. The method of claim 1, wherein a composite cathode layer is formed using an energy-assisted solvent-free spray process that uses an intermediate core-shell structure as the feedstock, wherein the intermediate core-shell structure comprises a partial shell formed onto the active cathode material, and wherein the core-shell structure of the composite cathode layer formed using the energy-assisted solvent-free spray process has increased shell coverage relative to the intermediate core-shell structure.

8. The method of claim 1, wherein the energy-assisted spray process is a low-temperature processing method such as cold spray.

9. The method of claim 1, wherein the energy-assisted spray process is a high-temperature processing method such as thermal spray.

10. The method of claim 1, wherein in the intermediate core-shell structure, a partial shell is formed onto the core using a high impact mixing or milling process prior to the energy-assisted solvent-free spray process.

11. The method of claim 1, wherein the solid-state ionic conductive membrane comprises at least one of a garnet-structure oxide material, a NASICON-structured material, a perovskite type oxide material, an anti-perovskite-type oxide material, a thiophosphate material, and an argyrodite structured sulfide.

12. The method of claim 1, wherein the anode comprises a lithium metal or lithium metal alloy film.

13. The method of claim 1, wherein the anode comprises a material that interacts with ions through an intercalation mechanism, a non-intercalation mechanism, or a combination thereof.

14. The method of claim 1, wherein the anode comprises at least one of a garnet-structure oxide material, a NASICON-structured material, a perovskite type oxide material, an anti-perovskite-type oxide material, a thiophosphate material, and an argyrodite structured sulfide.

15. The method of claim 1, wherein the anode comprises a lithium metal film formed onto the negative current collector after the first charging cycle.

16. A method for manufacturing a solid-state battery, comprising:
   forming an anode;
   forming a solid-state ionic conductive membrane; and
   forming a composite cathode formed onto a positive current collector using an energy-assisted solvent-free spray process, the composite cathode comprising:
   core-shell structures and a binding polymer, wherein the core is the active cathode material, and the shell is a mixture of ionically conductive catholyte and an electronically conductive additive.

17. The method of claim 16, wherein the core material of the core-shell structure comprises at least one intercalation material with the general structure $YMO_2$, $Y_{1+x}M_{1-x}O_2$, $YM_2O_4$, $YMPO_4$, $Y_2MSiO_4$, $YMBO_3$, or $YMPO_4F$, where M is Fe, Co, Ni, Mn, Cu, Cr, and where Y is Li, Na, K, Mg, Zn, Al.

18. The method of claim 16, wherein the shell material of the core-shell structure comprises at least one of a garnet-structure oxide material, a NASICON-structured material, a perovskite type oxide material, an anti-perovskite-type oxide material, a thiophosphate material, and an argyrodite structured sulfide.

19. The method of claim 16, wherein the shell material of the core-shell structure comprises at least one electronically conductive carbon material or metallic material.

20. The method of claim 16, wherein the core-shell structure has a shell coverage of at least 70% of the core material surface area.

* * * * *